(12) United States Patent
Smith

(10) Patent No.: US 6,483,913 B1
(45) Date of Patent: Nov. 19, 2002

(54) METHOD FOR INTERACTIVELY ENTERING ALPHANUMERIC TEXT INTO A MULTILINE DISPLAY DEVICE USING A KEYPAD

(75) Inventor: Edwin Derek Smith, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/909,107

(22) Filed: Jul. 19, 2001

(51) Int. Cl.[7] .............................................. H04M 1/00
(52) U.S. Cl. .................................. 379/368; 379/355.07
(58) Field of Search ............................ 379/368, 355.05, 379/355.07; 455/550, 560, 564; 345/169, 172

(56) References Cited

U.S. PATENT DOCUMENTS 5,797,098 A * 8/1998 Schroeder et al. ...... 379/355.05
6,046,732 A * 4/2000 Nishimoto .................. 345/168

\* cited by examiner

Primary Examiner—Forester W. Isen
Assistant Examiner—Jefferey Harold
(74) Attorney, Agent, or Firm—Randi L. Dulaney; Dale W. Dorinski

(57) ABSTRACT

A method for a human user to interactively enter an alphanumeric text message into a multiline display device (12) using a keypad (14) containing a number of keys. On one portion (22) of the display, the alphanumeric text message that the user is entering is displayed. On a second portion (23) of the display, a listing of subsets (24, 25) of alphanumeric symbols is shown, with each subset being mapped to a corresponding key on the keypad. The user selects the subset of alphanumeric symbols containing the one alphanumeric symbol to be entered into the alphanumeric text message and depresses the key that is mapped to the selected subset. In response to this action, the second portion of the display then changes to show the alphanumeric symbols contained in the selected subset, with each alphanumeric symbol mapped to a specific key on the keypad. The user then selects the desired alphanumeric symbol and depresses the proper key. In response to this activity, the selected alphanumeric symbol is displayed on the first portion of the multiline display device.

12 Claims, 4 Drawing Sheets

METHOD FOR INTERACTIVELY ENTERING ALPHANUMERIC TEXT INTO A MULTILINE DISPLAY DEVICE USING A KEYPAD

TECHNICAL FIELD

This invention relates in general to a telephonic alphanumeric data entry system, and more particularly, to a method of entering alphanumeric information into a cellular telephone.

BACKGROUND

Text input using the standard telephone touch tone key pad is typically slow and relatively difficult. The growth in text input required for generating email, instant messages, SMS and the like begs for a more productive text entry method. The standard telephone key pad is designed with only ten to twelve distinct keys, necessitating the interposition of some manner of translating device between the standard telephone set and the user's needs in order to input alphanumeric data. A typical telephone keypad includes 12 push-buttons, or keys, disposed in a matrix of 4 horizontal rows by 3 vertical columns. Each of the keys has associated therewith a unique number 0–9 and the * and # symbols. Overlaid on each of these keys is typically one or more letters of the alphabet, distributed in groups of three to four letters per key. For example, the "2" key typically has the letters "a-b-c" imprinted thereon. In general, systems for translating touch tone signals into alphanumeric data are known. For example, U.S. Pat. No. 3,381,275 describes a translator system utilizing what is known as a "twin depression" translation technique. Additionally, U.S. Pat. No. 4,427,848 entitled "Telephonic Alphanumeric Data Transmission System" describes a method whereby the alphabetic characters are transmitted by depressing a designated key (e.g., *) a number of times equal to the relative position of the inscription of the character on the key (i.e., the placement division of the alphabetic character), followed by the depression of the key on which the character is inscribed. A return to the numeric mode may be effected by depression of a second designated key (e.g. #).

Another example of a numeric to alphabetic translator is described in U.S. Pat. No. 3,618,038 utilizing a "delayed depression" translation technique, wherein depression of keys having different durations are discriminated. For example, an alphabetic character is represented by first depressing a key indicative of the placement division of the alphabetic character (e.g. the 1 key for Division 1, the 2 key for Division 2, or the 3 key for Division 3) for a duration longer than a preset limit, e.g., 290 milliseconds. The key inscribed with the particular alphabetic character is thereafter depressed for a duration less than the preset limit. Return to the numeric mode is effected by depressing a fourth symbol (e.g. the 0 key) for a period greater than the preset limit.

Still another touch tone to alphanumeric translation technique has been proposed whereby an alphabetic mode is entered by depressing a first key (e.g., *), followed by depressing a designated key corresponding to the placement division of a particular alphabetic character (e.g., 1, 2, or 3), followed by depression of the key on which the alphabetic character is inscribed. In addition, other translation techniques whereby each alphanumeric symbol is represented by a specific sequence of DTMF signals, with each character separated by a specific designated DTMF signal (e.g. #) have been proposed. An example of such a translation technique is described in Broomfield et al, Electronics, "Making a Data Terminal Out of the Touch-Tone Telephone," McGraw Hill, Jul. 3, 1980.

Each of the above translation systems may have advantages in respect of the entry and transmission of certain types of data. However, such techniques are, in general, slow and cumbersome, in that different combinations of a plurality of keys must be depressed to transmit the alphabetic characters. Most people do not possess sufficient manual dexterity or patience to use such systems proficiently. In addition, a further problem is inherent in the prior art translation systems, in that the user is provided no feedback during the entry of the data. The user is provided no indication that any valid data character has been transmitted, much less an indication of the specific data character transmitted. Particularly in view of the multi-key entry techniques, mistakes in the data often occur.

DETAILED DESCRIPTION OF THE PREFERRED EMBODIMENT

A method for a human user to interactively enter an alphanumeric text message into a multiline display device using a keypad containing a number of keys is disclosed. An alphanumeric text message is one which can incorporate any of the letters of the alphabet, the numbers, various symbols, icons, or other functions, and is not limited to the English language or other Western languages, but can also include languages such as Japanese, Chinese or the Cyrillic alphabet. On one portion of the display, the alphanumeric text message that the user is entering is displayed. On a second portion of the display, a listing of subsets of alphanumeric symbols is shown, with each subset being mapped to a corresponding key on the keypad. The user selects the subset of alphanumeric symbols containing the one alphanumeric symbol to be entered into the alphanumeric text message and depresses the key that is mapped to the selected subset. The second portion of the display then changes to show the alphanumeric symbols contained in the selected subset, with each alphanumeric symbol mapped to a specific key on the keypad. The user then selects the desired alphanumeric symbol and depresses the proper key. In response to this activity, the selected alphanumeric symbol is displayed on the first portion of the multiline display device. This data interface method provides for the full set of ASCII characters ("@", "$", "%" and so on) to be easily entered. Finally, a user may also assign specific characters and even commonly used strings ("shortcuts") to unused "fields" for further productivity gains.

Figure 1:
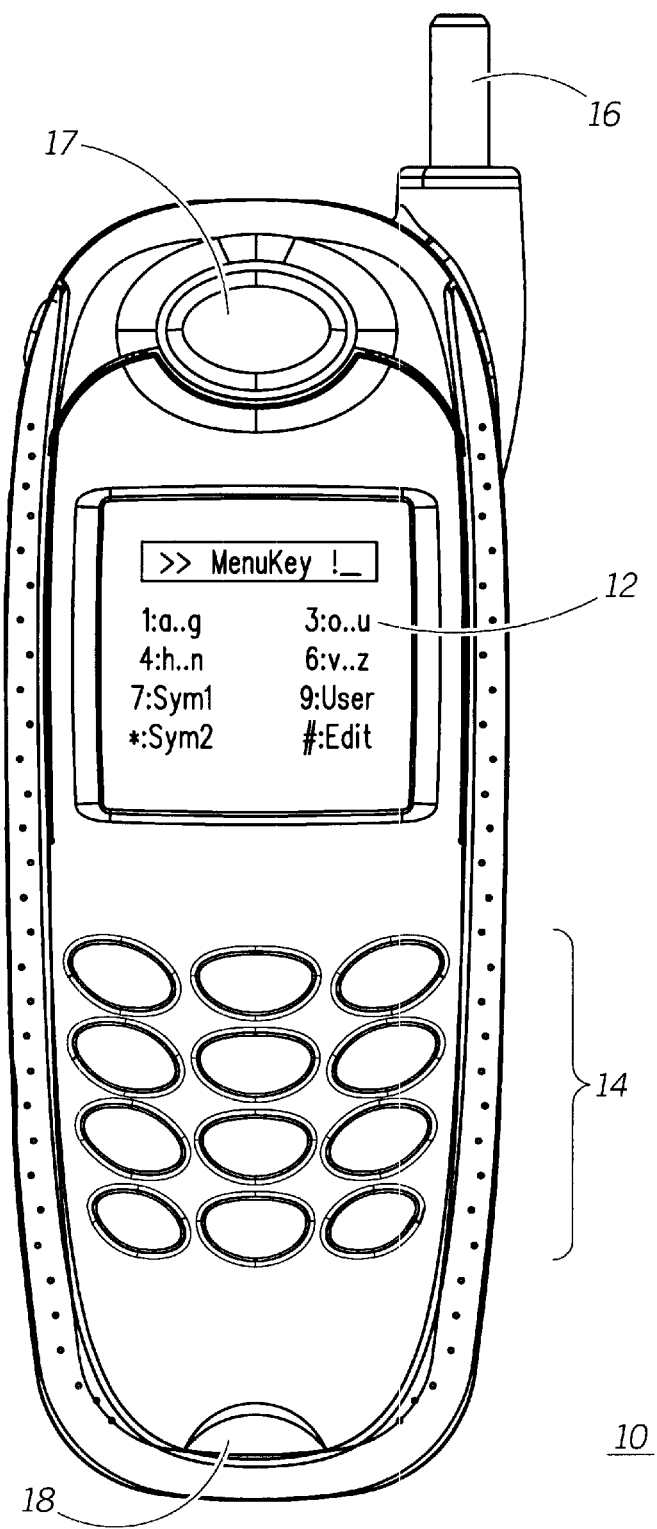
FIG. 1 is a depiction of a cellular telephone having a multiline display device in accordance with the invention.
Figure 2:
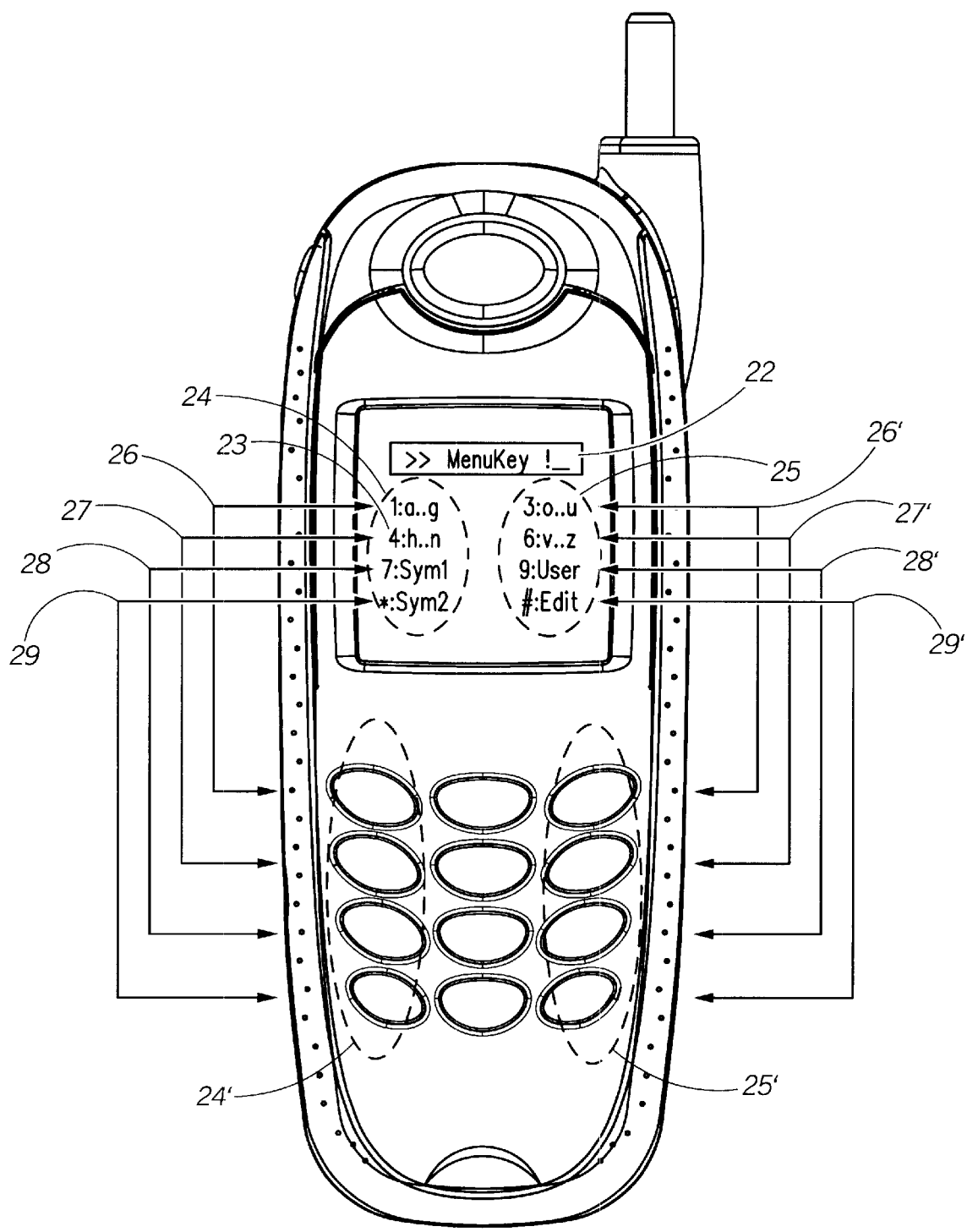
FIG. 2 is a depiction of the cellular telephone in FIG. 1 showing the mapping of various keys to respective fields in the multiline display device in accordance with the invention.

While the specification concludes with claims defining the features of the invention that, are regarded as novel, it is believed that the construction, method of operation and advantages of the invention will be better understood from a consideration of the following description in conjunction with the drawing figures, in which like reference numerals are carried forward. Although my invention will be described below in a form that is adapted for use in a cellular telephone, it is to be understood that it can also be utilized in any other type of electronic device that incorporates a display and a keypad, and as such, is not intended to be limited to telephonic applications. For example, other portable electronic communication devices such as two-way radios, pagers, personal digital assistants (PDAs), etc. will also benefit from the invention. It can also be incorporated in settings so diverse as automobile radios and compact disc players that have keypads and displays. Given the unending proliferation of electronic devices that incorporate keypads and displays, the number of devices that would benefit from my invention is innumerable. Referring now to FIG. 1, a typical cellular telephone handset 10 contains, among other features, a display device 12 such as a liquid crystal display and a keypad 14. The keypad 14 typically contains a plurality of individual keys arranged in a 3–4 matrix, typically twelve keys, one each assigned to the numbers 0–9 and the symbols "*" and "#", but depending on the configuration of the particular cellular telephone handset, there may be additional keys devoted to other functions. This type of keypad layout is often referred to as a "T-9" keypad. The typical cellular telephone handset 10 also contains an antenna 16, a speaker 17, a microphone 18, and a battery, transmitter, receiver, signal processor, microcomputer controller, digital signal processor, and other electronic components that are not shown. Referring now to FIG. 2, one embodiment of this interactive input method relies upon the display for presenting selection choices to the user, and the keypad for making those selections. A first portion 22 of the display, typically one or more lines, is used to show the text that has been entered and to indicate the current "cursor" position where the next character will be placed. If no text has been entered yet, then a blinking cursor will simply be displayed. The remainder or second portion 23 of the display is divided into two or more columns 24, that correspond to and are mapped to columns of keys 24' 25' on the keypad. Although FIG. 2 depicts two columns only, additional functionality could be provided with a third column, utilizing the center column of the keypad. Each line of the second portion 23 of the display is mapped to a corresponding keypad row, as shown by lines 26, 26', 27, 27' 28, 28' 29, 29'. (Although FIG. 2 depicts four lines in the display mapped to four rows of keys, other numbers of lines and keys can be used with equal efficacy, and various combinations of lines and keys can also be employed.) Therefore, a 5-line display would use the first line for displaying text, and then divide the remaining four lines into two columns each, to create 8 "fields". The four fields in the left column are mapped to the "1", "4", "7", and "*" keys respectively. The four fields in the right column are mapped to the "3", "6", "9" and "#". Each of the fields contains a listing of the letters or symbols that are resident in that field. For example, the field in the top left of the second portion 24 of the display contains the letters 'a' through 'g' inclusive, and is mapped to the '1' key, as shown by the numeral '1' in the display. The use of displaying the key number that corresponds to each field aids the user in selecting the proper key, but is optional, and indeed some applications will find that it is better to simply display the contents associated with the key rather than also displaying the key itself. Continuing on with this example, the second row in the left column of the display contains the letters 'h' through 'n' inclusive, and so on. Since we are only using two columns of keys in this example (that is, a total of 8 keys, 4 on each of the two outside columns), each field can only contain a maximum of 8 members, so that each member will be mapped to a unique key in the next phase of data entry. One can see that a wide variety of letters and/or symbols or functions can be contained in a small number of fields.

Figure 3:
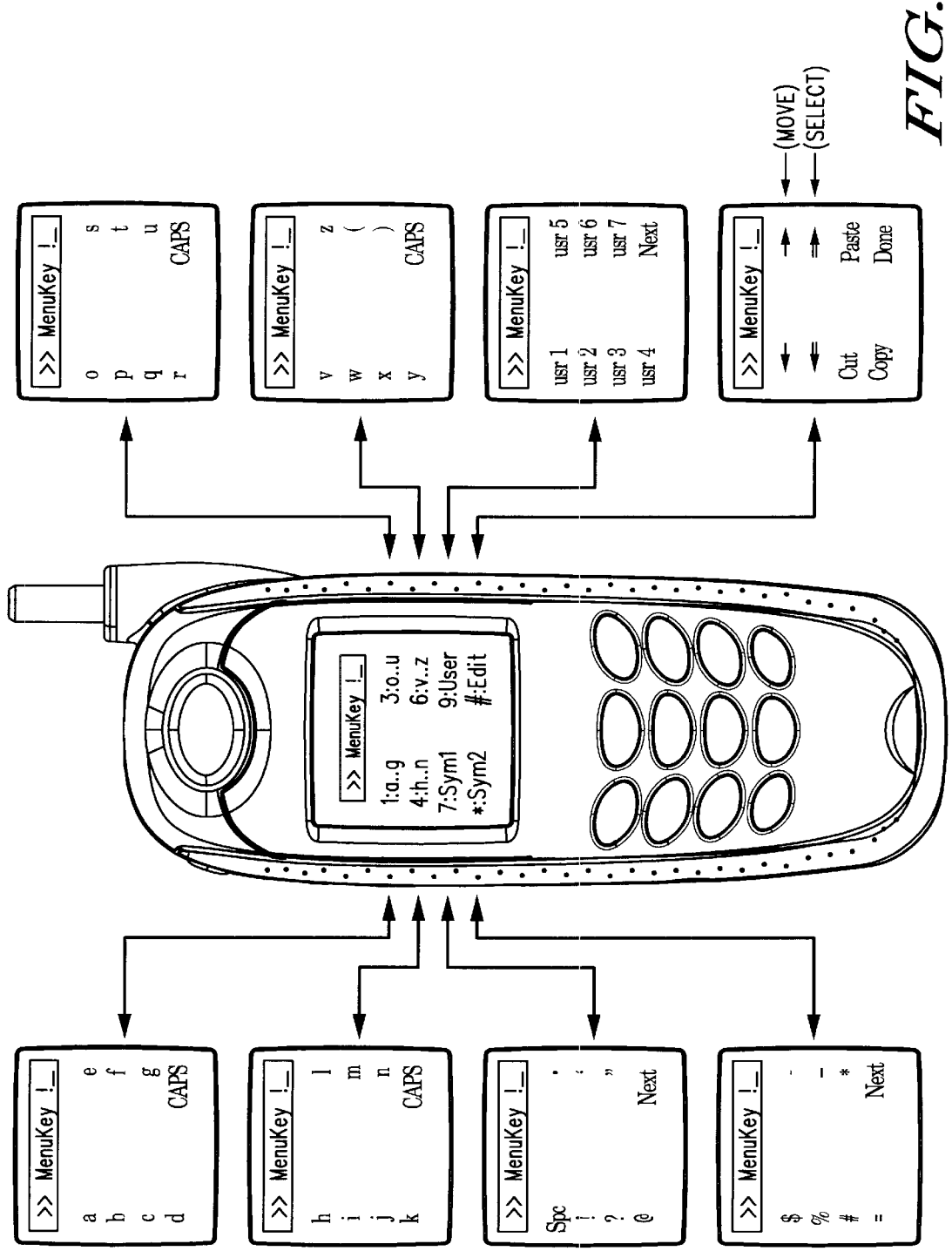
FIG. 3 is a depiction of the cellular telephone in FIG. 2, showing the subscreens represented by each of the fields in accordance with the invention.

Referring now to FIG. 3, the members of each field are shown in detail. Since in this example, we are using 8 keys, there are 8 fields, and each of the 8 fields in the second portion of the display contains 8 members, for a total of 64 members (8 times 8). Since there are only 26 letters in the alphabet, we are now faced with an overabundance of possible allocations, so we can now begin to add rich functionality by incorporating symbols, functions such as shift, left arrow, right arrow, cut, paste, etc. This is in stark contrast to prior art methodology that struggles to accommodate the 26 letters of the alphabet.

Figure 4:
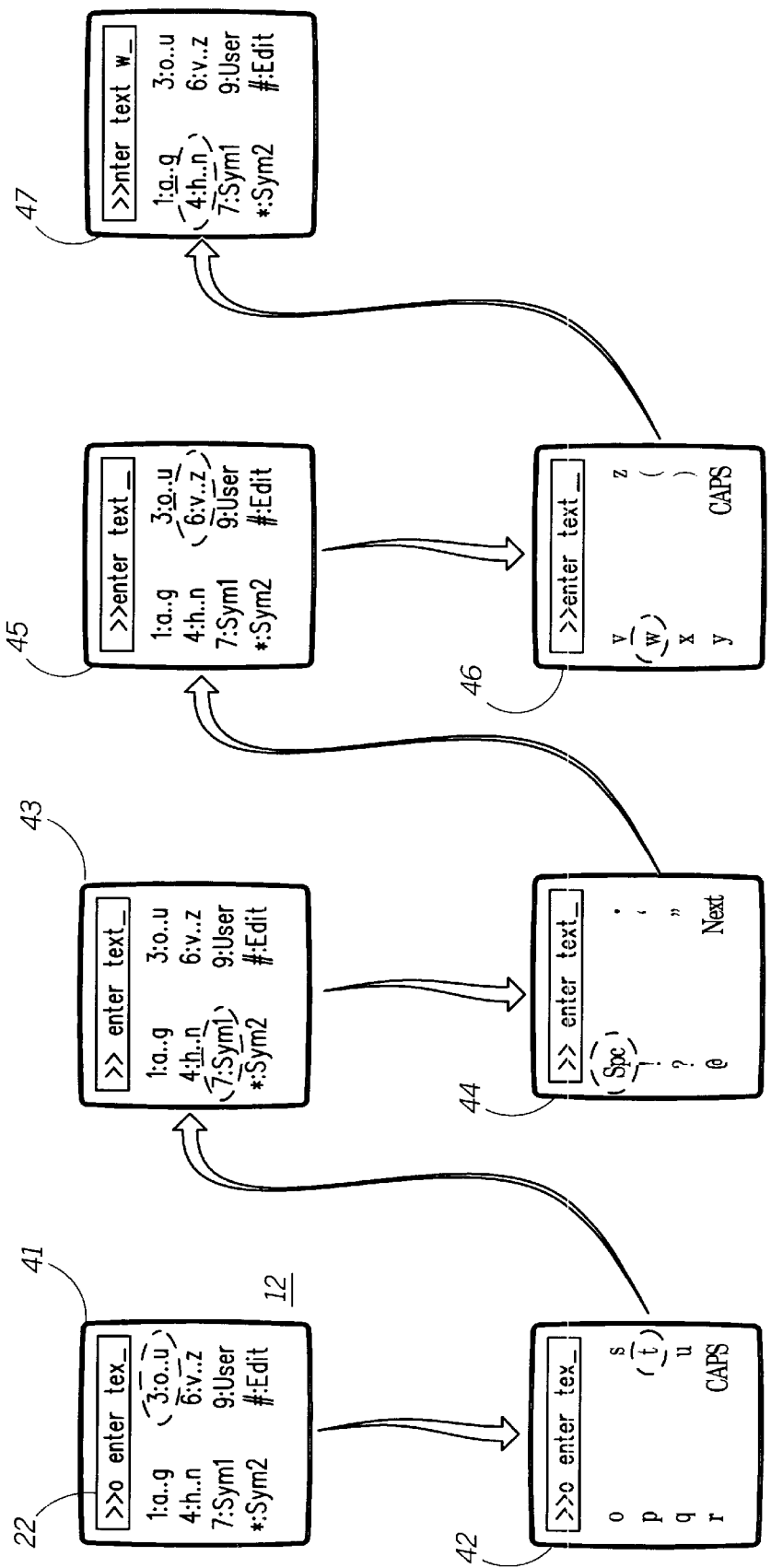
FIG. 4 is an example of the various screens that a user might see on the display of a cellular telephone as a sample phrase is entered, in accordance with the invention.

FIG. 4 shows an example of what the user might see on the display 12 of a cellular telephone 10 as a sample phrase is entered using my invention via the keypad 14. Continuing with my example, assume now that the user desires to enter the phrase "To enter text with", and has already entered the text "To enter tex" as shown in the first portion 22 of the display 12, and is now ready to enter the next letter, "t". This hypothetical user, who possesses merely a rudimentary level of cognitive skills, knows that the letter 't' is contained in the field whose members are 'o–u', and so the user depresses the '3' key, which one can see is mapped to the top row in the right hand column of the second portion of the display ('o–u'). This step is diagramed in FIG. 4 by the screens depicted by reference elements 41 and 42, where the large arrows point to the field and letter desired to be selected. After the user has depressed the '3' key in response to viewing screen 41, the second portion 22 of the display 12 changes as shown in screen 42 so that each of the letters 'o, p, q, r, s, t, u' are in unique positions such that each is mapped to a specific key on the keypad. With the individual letters now displayed on screen 42, the user selects the letter 't' by depressing the '6' key, which is mapped to the letter 't'. In response to activation of the '6' key, the display now changes to that shown in screen 43. Note that the upper portion 22 of the display has changed and now includes the letter 't' properly appended to form the word 'text' and that the cursor has moved to the right. The user now desires to enter a space between words, and so selects the field 'Sym1' (which contains a variety of symbols) by depressing the '7' key, which is accordingly mapped. In response to activating the '7' key, the display now changes to that shown in screen 44, where 8 symbols are displayed in unique positions such that each is again mapped to a specific key on the keypad. The user now enters a space by depressing the '1' key on the keypad, which the reader can see is mapped to the 'space' function. In response to this data entry, screen 44 now changes to reveal screen 45, which has changed to include a space properly appended after the word 'text' and that the cursor has again moved to the right. Continuing with my example, the user now desires to enter the letter 'w', and knows that the letter 'w' is contained in the field whose members are 'v, w, x, y, z', and so selects the field 'v.z" by depressing the '6' key, which is accordingly mapped. In response to activating the '6' key, the display now changes to that shown in screen 46, where 'v, w, x, y, z, (, ), and CAPS' are displayed in unique positions such that each is again mapped to a specific key on the keypad. With this matrix now displayed on screen 46, the user selects the letter 'w' by depressing the '4' key, which is mapped to the letter 'w'. In response to this data entry, screen 46 now changes to reveal screen 47, which has changed to include the letter 'w' properly appended after the space and that the cursor has again moved to the right.

The astute reader will now appreciate that similar sequences are repeated by the user as required to enter the remainder of the phrase, and of course, any other data that the user might select. This example is presented by way of elucidation only, and is not intended to limit the claims to the example presented. Clearly, the use of my invention can incorporate a wide variety of symbols and functions, such as delete, shift, tab, move, backspace, page up, page down, home, end, clear, exit, done, cancel, go, back, escape, copy, paste, cut, done, next, more, and select.

I find that the best way to manipulate the keys is for the user to hold the cellular telephone with two hands, and use the left and right thumbs for making selections. Alternate arrangements could be made using customized preferences. One example might be to map the right four fields to the middle column of keys ("2" through "0") for single-handed operation in which the right thumb reaches all 8 keys. Alternately, selections could be arranged for a left-handed user that maps selected keys to the dominant hand. After a very brief learning curve, the user is able to quickly and easily enter a much wider variety of data into the electronic device with only two key presses per entry, as opposed to 3 or 4 when using prior art methods. This arrangement provides for an input method that has a natural rhythm and in which the desired character is in a predictable location. The displayed fields are never occluded by the user's fingers, thus improving ease of use and efficiency. In addition, the first portion of display provides visual feedback to the user as to the data being entered.

Although my invention has been illustrated and described with respect to a cellular telephone, it can also be utilized for other devices such as web tablets that do not have a traditional keyboard or other devices that use hard keys on the side of the device to offer a small form factor. Devices with touch displays, such as PocketPC's or Palm Computers could utilize areas on the screen to represent selection regions that the user touches. It is anticipated that the methodology could be applied to other systems such as remote controls for televisions, radios, video recorders, disc players, etc.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for a human user to interactively enter an alphanumeric text message into a multiline display device using a keypad containing a plurality of keys, comprising:
   a) the multiline display device displaying, on a first portion of said device, an area for said alphanumeric text message;
   b) the multiline display device displaying, on a second portion of said device, a listing of subsets of alphanumeric symbols, each subset being mapped to a corresponding key on said keypad;
   c) the user selecting from the listing, a subset of alphanumeric symbols containing the one alphanumeric symbol to be entered into the alphanumeric text message and activating a key on the keypad that is mapped to the selected subset;
   d) in response to the user activating the key in step (c), the multiline display device displaying, on said second portion, the alphanumeric symbols contained in the selected subset, each alphanumeric symbol mapped to a key on the keypad;
   e) the user, selecting the one alphanumeric symbol to be entered into the alphanumeric text message and activating a key on the keypad that is mapped to the selected symbol; and
   f) in response to the user activating the key in step (e), the multiline display device displaying, on said first portion, the selected alphanumeric symbol.

2. The method as described in claim 1, further comprising: after step (f), interactively entering an additional alphanumeric symbol into the multiline display device by repeating steps (b) through (f) in order.

3. The method as described in claim 1, wherein the multiline display device is a display on a cellular telephone and the keypad is a T9 keypad.

4. The method as described in claim 1, further comprising, after the completion of step (f), said second portion of the said device displaying the listing of subsets of alphanumeric symbols as described in step (b).

5. The method as described in claim 1, wherein one or more of the subsets of alphanumeric symbols contains one or more functions selected from the group consisting of delete, shift, tab, move, backspace, page up, page down, home, end, clear, exit, done, cancel, go, back, escape, copy, paste, cut, done, next, more, and select.

6. A method for a human user to interactively enter a message into a multiline display device using a keypad containing a plurality of keys, comprising:
   a) the multiline display device displaying, on a first portion of said device, an area for said message;
   b) the multiline display device displaying, on a second portion of said device, a listing of subsets of functions, each subset being mapped to a corresponding key on said keypad;
   c) the user selecting from the listing, a subset of functions containing the single function desired by the user to be entered into the message and activating a key on the keypad that is mapped to the selected subset;
   d) in response to the user activating the key in step (c), the multiline display device displaying, on said second portion, the individual functions contained in the selected subset, each function mapped to a key on the keypad;
   e) the user, selecting the single function to be entered into the message and activating a key on the keypad that is mapped to the selected symbol; and
   f) performing the selected single function in response to the user activating the key in step (e).

7. The method as described in claim 6, wherein the multiline display device is a display on a cellular telephone and the keypad is a T9 keypad.

8. The method as described in claim 6, wherein one or more of the subsets of functions is selected from the group consisting of delete, shift, tab, move, backspace, page up, page down, home, end, clear, exit, done, cancel, go, back, escape, copy, paste, cut, done, next, more, and select.

9. The method as described in claim 1, further comprising, after the completion of step (f), said second portion of the said device displaying the listing of subsets of functions as described in step (b).

10. A method for a human user to interactively enter a message into a multiline display device using a keypad containing a plurality of keys, comprising:

a) the multiline display device displaying, on a first portion of said device, an area for said message;

b) the multiline display device displaying, on a second portion of said device, a listing of subsets of user defined representative data, each subset being mapped to a corresponding key on said keypad;

c) the user selecting from the listing, a subset of user defined representative data containing the single user defined representative data to be entered into the message and activating a key on the keypad that is mapped to the selected subset;

d) in response to the user activating the key in step (c), the multiline display device displaying, on said second portion, the user defined representative data contained in the selected subset, each individual user defined representative data mapped to a key on the keypad;

e) the user, selecting the one user defined representative data to be entered into the message and activating a key on the keypad that is mapped to it; and f) in response to the user activating the key in step (e), the multiline display device displaying, on said first portion, the selected user defined representative data.

11. The method as described in claim 10, wherein the multiline display device is a display on a cellular telephone and the keypad is a T9 keypad.

12. The method as described in claim 1, further comprising, after the completion of step (f), said second portion of the said device displaying the listing of subsets of user defined representative data as described in step (b).

* * * * *